(12) United States Patent
Zhou et al.

(10) Patent No.: US 12,382,543 B2
(45) Date of Patent: Aug. 5, 2025

(54) LAYER ONE/LAYER TWO (L1/L2) SIGNALING TO RELEASE CELLS CONFIGURED FOR L1/L2 INTER-CELL MOBILITY

(71) Applicant: QUALCOMM Incorporated, San Diego, CA (US)

(72) Inventors: Shanyu Zhou, San Diego, CA (US); Aleksandar Damnjanovic, Del Mar, CA (US); Jelena Damnjanovic, Del Mar, CA (US); Ozcan Ozturk, San Diego, CA (US); Tao Luo, San Diego, CA (US)

( * ) Notice: Subject to any disclaimer, the term of this patent is extended or adjusted under 35 U.S.C. 154(b) by 446 days.

(21) Appl. No.: 17/879,652

(22) Filed: Aug. 2, 2022

(65) Prior Publication Data

US 2024/0049348 A1    Feb. 8, 2024

(51) Int. Cl.
*H04W 76/30*    (2018.01)
*H04W 8/08*    (2009.01)
*H04W 80/02*    (2009.01)

(52) U.S. Cl.
CPC ............ *H04W 76/30* (2018.02); *H04W 8/08* (2013.01); *H04W 80/02* (2013.01)

(58) Field of Classification Search
None
See application file for complete search history.

(56) References Cited

U.S. PATENT DOCUMENTS

2021/0297959 A1    9/2021 Zhou et al.
2021/0385702 A1    12/2021 Damnjanovic et al.
2022/0182894 A1    6/2022 Damnjanovic et al.
2023/0309093 A1*   9/2023 Wei .................... H04W 72/1268
2023/0328672 A1    10/2023 Damnjanovic et al.
2024/0334263 A1*   10/2024 Zhang ............... H04W 36/0055
2025/0071639 A1*   2/2025 Hong ............. H04W 36/00835

FOREIGN PATENT DOCUMENTS

WO    WO-2023077317 A1 *   5/2023    ........ H04W 36/0055
WO    WO-2024018609 A1 *   1/2024

OTHER PUBLICATIONS

Qualcomm, "Discussion on L1/L2 Mobility", 3GPP TSG-RAN WG2 Meeting #113-bis-e, R2-2103079, Apr. 20, 2021 (Year: 2021).*
International Search Report and Written Opinion—PCT/US2023/028131—ISA/EPO—Nov. 6, 2023.
Qualcomm Incorporated: "Discussion on L1/L2 Mobility", 3GPP TSG-RAN WG2 Meeting #113-bis-e, R2-2103079, 3rd Generation Partnership Project, Apr. 12, 2021-Apr. 20, 2021, pp. 1-6.

* cited by examiner

*Primary Examiner* — Jenkey Van
(74) *Attorney, Agent, or Firm* — Qualcomm Incorporated/Seyfarth Shaw LLP

(57) ABSTRACT

A method for wireless communication by a user equipment (UE) includes receiving an indication of a mobility configured cell set having a number of cells. The method also includes receiving signaling to release a selected cell from the mobility configured cell set. The method further includes releasing the selected cell from the mobility configured cell set in response to receiving the signaling. In some aspects, releasing the selected cell comprises removing the selected cell from a carrier aggregation configuration. In other aspects, releasing the selected cell comprises removing a mobility configuration for the selected cell.

27 Claims, 9 Drawing Sheets

LAYER ONE/LAYER TWO (L1/L2) SIGNALING TO RELEASE CELLS CONFIGURED FOR L1/L2 INTER-CELL MOBILITY

FIELD OF THE DISCLOSURE

The present disclosure relates generally to wireless communications, and more specifically to layer one and/or layer two (L1/L2) signaling to release cells that are configured for L1/L2 inter-cell mobility.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication by a user equipment (UE) includes receiving an indication of a mobility configured cell set. The mobility configured cell set has a number of cells. The method also includes receiving signaling to release a selected cell from the mobility configured cell set. The method further includes releasing the selected cell from the mobility configured cell set in response to receiving the signaling.

In other aspects of the present disclosure, a method for wireless communication by a network entity includes transmitting an indication of a mobility configured cell set. The mobility configured cell set has a number of cells. The method also includes transmitting signaling to release a selected cell from the mobility configured cell set. The method further includes releasing the selected cell from the mobility configured cell set in response to transmitting the signaling.

Other aspects of the present disclosure are directed to an apparatus. The apparatus has a memory and one or more processors coupled to the memory. The processor(s) is configured to receive an indication of a mobility configured cell set. The mobility configured cell set has a number of cells. The processor(s) is also configured to receive signaling to release a selected cell from the mobility configured cell set. The processor(s) is further configured to release the selected cell from the mobility configured cell set in response to receiving the signaling.

Other aspect of the present disclosure are directed to an apparatus. The apparatus has a memory and one or more processors coupled to the memory. The processor(s) is configured to transmit an indication of a mobility configured cell set. The mobility configured cell set has a number of cells. The processor(s) is configured to transmit signaling to release a selected cell from the mobility configured cell set. The processor(s) is further configured to release the selected cell from the mobility configured cell set in response to transmitting the signaling.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
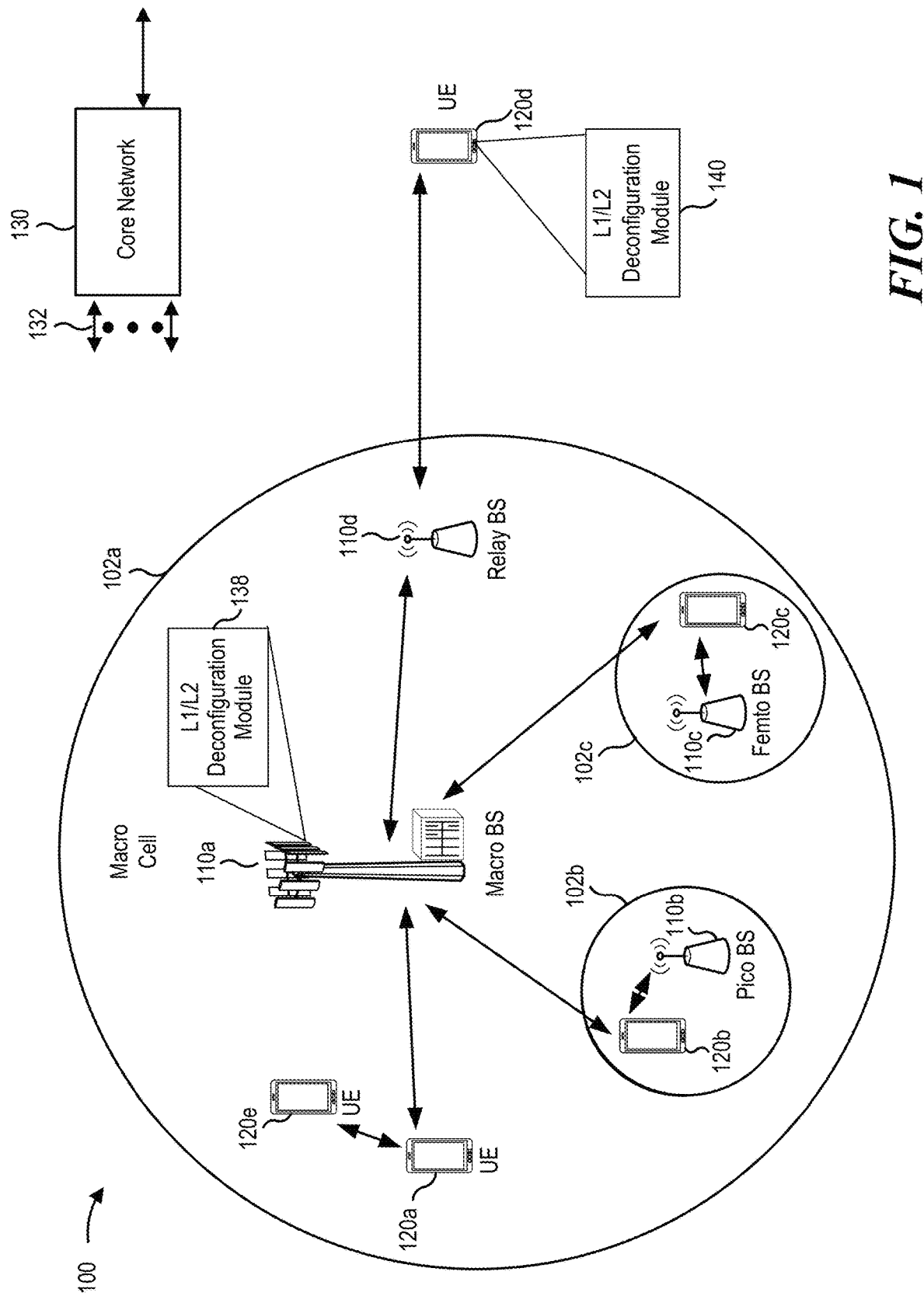
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Existing techniques for updating a primary cell of a user equipment (UE) during inter-cell mobility of the UE require a radio resource control (RRC) reconfiguration to be performed by a network entity. However, RRC reconfiguration is an example of layer three signaling. Thus, the latency of layer three signaling can prevent the UE from successfully updating to the new primary cell if the UE is moving fast and/or if the latency requirements of the UE require constant control and data connections with the primary cell while the UE is moving.

Accordingly, the described techniques reduce the latency for the UE to update to a new primary cell by using layer one/layer two (L1/L2) signaling from the network entity for mobility latency reduction. In an aspect of the present disclosure, the L1/L2 signaling is an L1/L2 mobility configuration that includes at least a primary cell configuration for each secondary cell, and at least a secondary cell configuration for each primary cell, which allows the UE to quickly switch from one primary cell to another because the UE already stores the configurations. In another aspect, the L1/L2 signaling is an L1/L2 mobility configuration that includes both primary cell and secondary cell configurations for all primary and secondary cells, which again allows the UE to quickly switch from one primary cell to another because the UE already has the configurations.

Aspects of the present disclosure specify mechanisms and procedures for layer one/layer two (L1/L2)-based inter-cell mobility to reduce mobility latency. Aspects are directed to configuring and maintaining multiple candidate cells to improve a speed at which candidate cells may be configured. Aspects are also directed to a dynamic switching mechanism among candidate serving cells (including special cells (Sp-Cells) and secondary cells (SCells)) for potential applicable scenarios based on L1/L2 signaling. More specifically, release of cells configured with L1/L2 mobility is contemplated.

In aspects of the present disclosure, L1/L2 signaling may remove cells from the configured L1/L2 mobility cell set, releasing the cells from the configured mobility cell set. Other aspects include a MAC-CE/downlink control information (DCI) format design and error handling techniques. Although carrier aggregation configurations are discussed, the present disclosure has applicability in other areas, such as scenarios directed to adding and removing multiple transmit and receive points (mTRPs).

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5GNB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an L1/L2 deconfiguration module 140. For brevity, only one UE 120d is shown as including the L1/L2 deconfiguration module 140. The L1/L2 deconfiguration module 140 may receive an indication of a mobility configured cell set having a number of cells. The L1/L2 deconfiguration module 140 may also receive signaling to release a selected cell from the mobility configured cell set. The L1/L2 deconfiguration module 140 may further release the selected cell from the mobility configured cell set in response to receiving the signaling.

Figure 3:
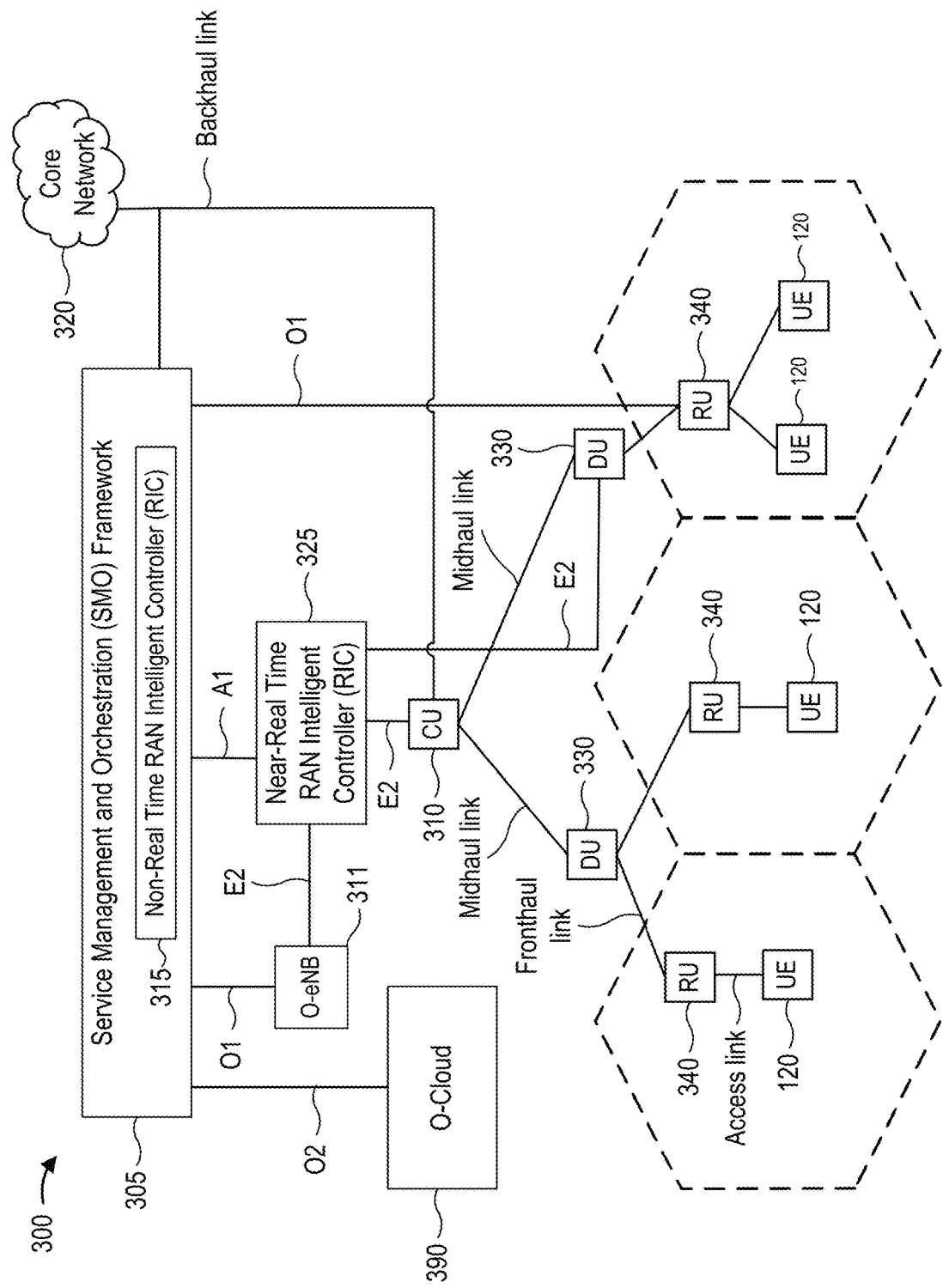
FIG. 3 is a block diagram illustrating an example disaggregated base station architecture, in accordance with various aspects of the present disclosure.

The core network 130 or the base stations 110 or any other network device (e.g., as seen in FIG. 3) may include an L1/L2 deconfiguration module 138. For brevity, only one base station 110a is shown as including the L1/L2 deconfiguration module 138. The L1/L2 deconfiguration module 138 may transmit an indication of a mobility configured cell set having a number of cells. The L1/L2 deconfiguration module 138 may also transmit signaling to release a selected cell from the mobility configured cell set. The L1/L2 deconfiguration module 138 may further release the selected cell from the mobility configured cell set in response to transmitting the signaling.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
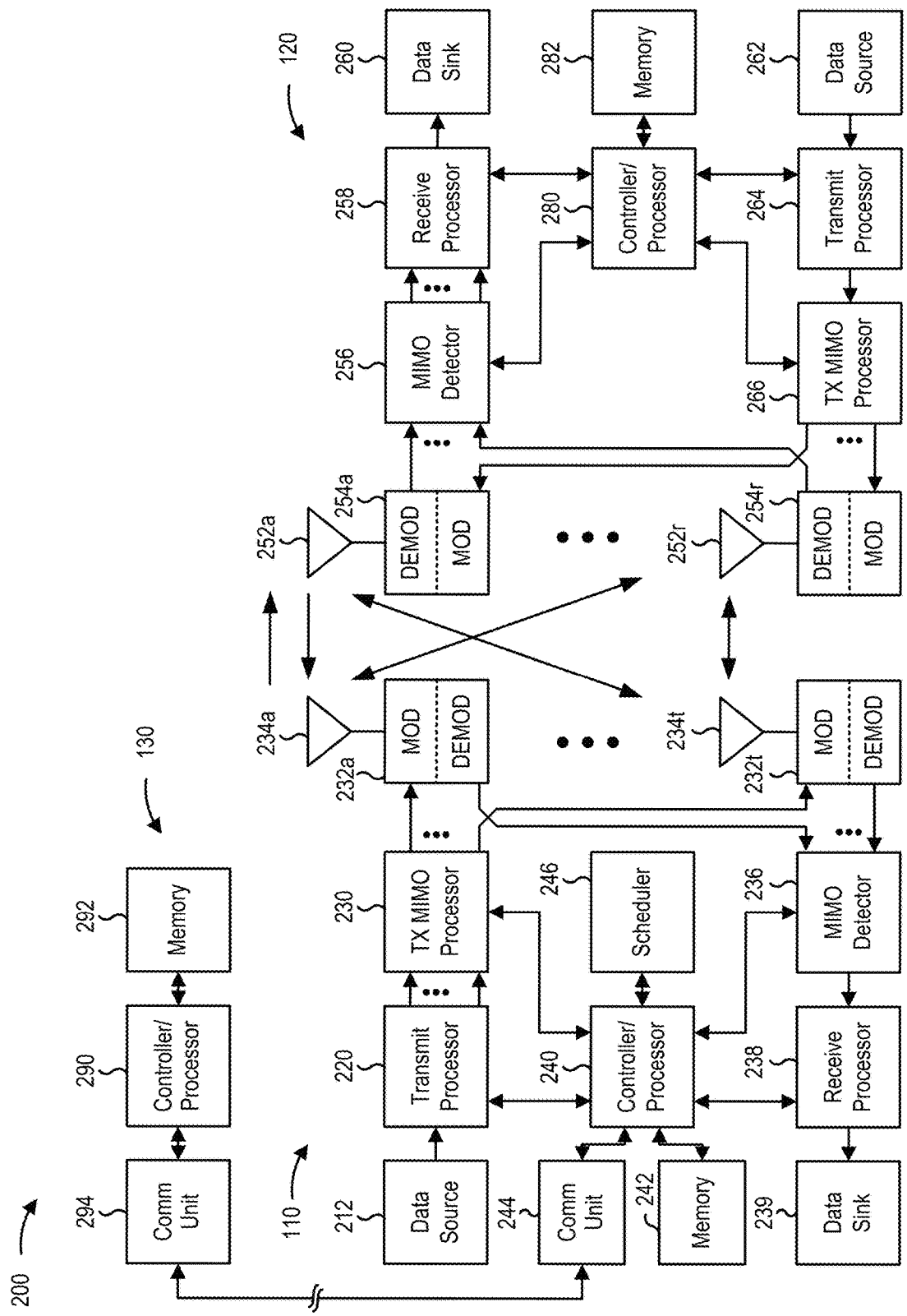
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with L1/L2 deconfiguration, as described in more detail elsewhere. For example, the controller/processor 240 of the base station 110, the controller/processor 280 of the UE 120, and/or any other component(s) of FIG. 2 may perform or direct operations of, for example, the processes of FIGS. 9 and 10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for releasing, means for transmitting, means for recording, and means for confirming. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Aspects of the present disclosure specify mechanisms and procedures for layer one/layer two (L1/L2)-based inter-cell mobility to reduce mobility latency. Aspects are directed to configuring and maintaining multiple candidate cells to improve a speed at which candidate cells may be configured. Aspects are also directed to a dynamic switching mechanism among candidate serving cells (including special cells (SpCells) and secondary cells (SCells)) for potential applicable scenarios based on L1/L2 signaling. More specifically, release of cells configured with L1/L2 mobility is contemplated. Although carrier aggregation configurations are discussed, the present disclosure has applicability in other areas, such as scenarios directed to adding and removing multiple transmit and receive points (mTRPs).

The procedures for L1/L2-based inter-cell mobility are applicable to many scenarios, including standalone deployments, carrier aggregation (CA) deployments, and new radio-dual connectivity (NR-DC) cases with a serving cell change within one configured grant (CG). The L1/L2 procedures are also applicable to intra-distributed unit (DU) cases, intra-centralized unit (CU) cases, and inter-DU cases for standalone and carrier aggregation deployments. These procedures have further applicability to intra-frequency, inter-frequency, frequency range one (FR1), frequency range two (FR2), and other scenarios regardless of whether the source and target cells are synchronized.

Existing techniques for updating a primary cell of a user equipment (UE) during inter-cell mobility of the UE require a radio resource control (RRC) reconfiguration to be performed by a network entity. However, RRC reconfiguration is an example of layer three signaling. Thus, the latency of layer three signaling can prevent a UE from successfully updating to a new primary cell if the UE is moving fast and/or if the latency requirements of the UE specify constant control and data connectivity with the primary cell while the UE is moving.

Accordingly, the described techniques reduce the latency for the UE to update to a new primary cell and to release configured cells by using layer one/layer two (L1/L2) signaling from the network entity. In an aspect of the present disclosure, the L1/L2 signaling is an L1/L2 mobility configuration that includes at least a primary cell configuration for each secondary cell, and at least a secondary cell configuration for each primary cell, which allows the UE to quickly switch from one primary cell to another because the UE is storing the configurations. In another aspect, the L1/L2 signaling is an L1/L2 mobility configuration that includes both primary cell and secondary cell configurations for all primary and secondary cells, which again allows the UE to quickly switch from one primary cell to another because the UE already stores the configurations. In yet other aspects, the L1/L2 signaling deconfigures a cell by either releasing the cell from a configured cell set or removing L1/L2 mobility configuration from the cell.

Figure 4:
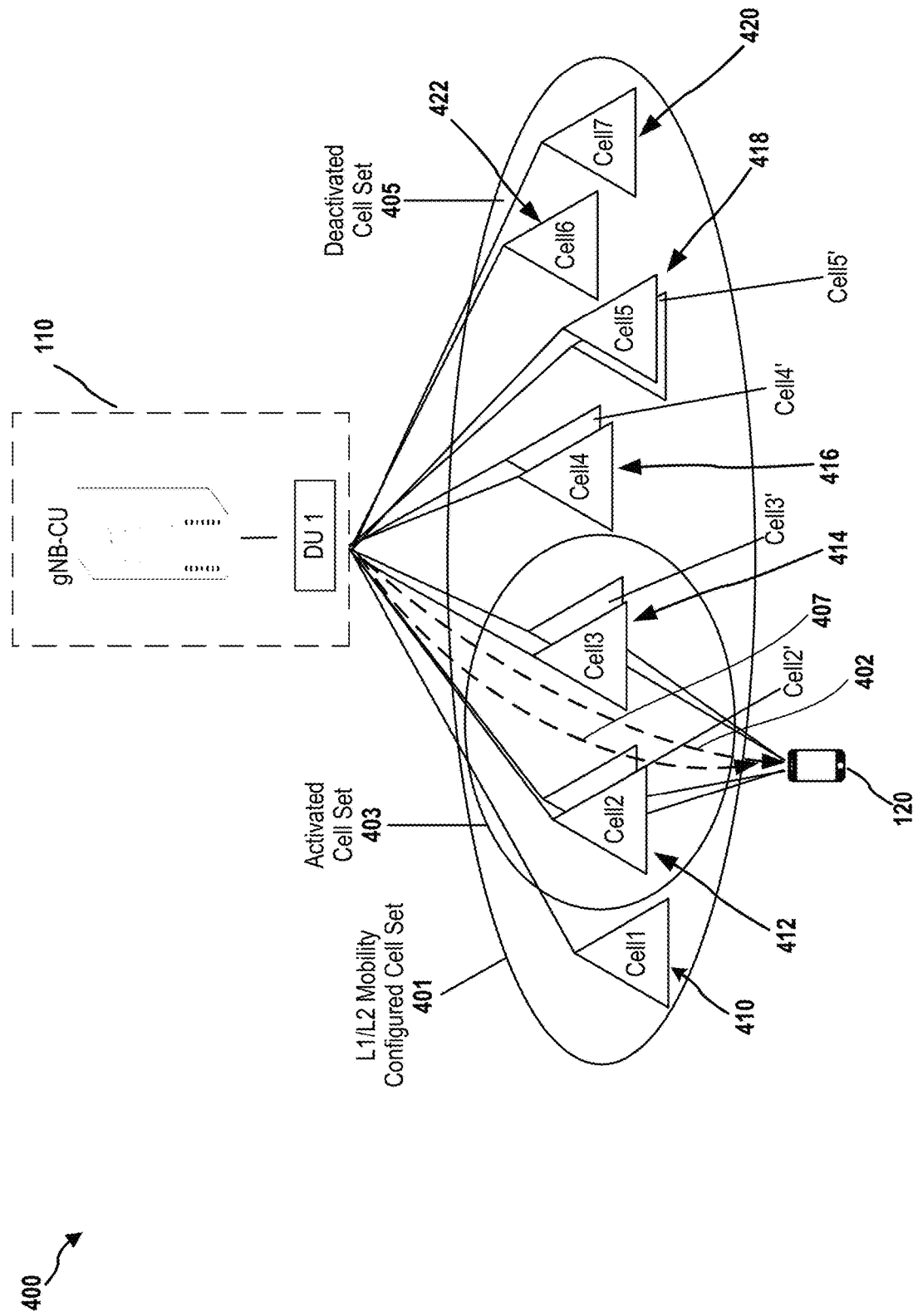
FIG. 4 is a block diagram illustrating an example of a layer one/layer two (LT/L2) mobility configured cell set, in accordance with various aspects of the present disclosure.

FIG. 4 is a diagram 400 illustrating an example of an L1/L2 mobility configured cell set. Currently, a network entity such as a base station 110, or a component of a D-RAN or O-RAN architecture, may configure the UE 120 with a layer one/layer two (L1/L2) mobility configured cell set 401 via an RRC configuration 402. For example, the network entity 110 may configure an L1/L2 mobility configured cell set 401 including cells 410, 412, 414, 416, 418, 420, and 422, for the UE 120. The cell set should be large enough to cover a meaningful mobility area. Each of the cells 410, 412, 414, 416, 418, 420, and 422 may operate on different frequencies. In some implementations, one or more cells of the L1/L2 mobility configured cell set 401 may be multiple transmit and receive point (mTRP) cells. For example, as shown in FIG. 4, cells 412, 414, 416, and 418 are mTRP cells. Each TRP of an mTRP cell may operate at different frequencies. For example, for the mTRP cell 412, Cell2 is one TRP of the mTRP cell 412 operating at a first frequency and Cell2' is another TRP of the mTRP 412 operating at a second frequency. Similarly, for the mTRP cell 414, Cell3 is one TRP operating at a third frequency and Cell3' is another TRP operating at a fourth frequency. In some implementations, the first and third frequencies may be the same frequency, and the second and fourth frequencies may be the same frequency. For the mTRP cell 416, Cell4 and Cell4' are different TRPs operating at different frequencies, and for the mTRP cell 418, Cell5 and Cell5' are different TRPs operating at different frequencies. In some implementations, Cell4 and/or Cell5 may operate on the same frequency as Cell2 and/or Cell3, and Cell4' and/or Cell5' may operate on the same frequency as Cell2' and/or Cell3'. Only one frequency may be activated at a time for mTRP cells, and the mTRP cell may operate using the TRP corresponding to that frequency.

Of the cells configured to be part of the L1/L2 mobility configured cell set 401, the network entity 110 may configure cells 412 and 414 as activated cells in an activated cell set 403, and the remaining cells (e.g., cells 410, 416, 418, 420, and 422) as deactivated cells in a deactivated cell set 405. The network entity 110 may configure one of the activated cells as a primary cell (PCell) for the UE 120, and the other cells as secondary cells (SCells). The network entity 110 may transmit to the UE 120 configurations for the cells 410, 412, 414, 416, 418, 420, and 422 via an RRC message or RRC configuration 402. Each cell configuration may only include parameters for its current cell type. For example, if the cell 410 is currently an SCell, then the configuration for the cell 410 will include parameters for the SCell, but no PCell configurations or parameters for the PCell. Similarly, if the cell 412 is currently configured as a PCell, then the configuration for the cell 412 will include parameters for the PCell, but no SCell configurations or parameters of SCell configurations.

Therefore, if the PCell for the UE 120 needs to be updated to a new cell, then the network entity 110 will have to perform an RRC reconfiguration and may transmit new or updated configurations for the cells 410, 412, 414, 416, 418, 420, and/or 422. The new or updated configuration for the new cell configured as the PCell will include parameters for PCell configuration, but not an SCell configuration. The configuration of the cell previously configured as the PCell will now include parameters for an SCell configuration but not a PCell configuration.

As discussed, RRC reconfiguration is an example of a layer three (L3) configuration with L3 signaling, and the latency of L3 configuration or signaling can prevent the UE 120 from successfully updating to the new PCell when the UE 120 is moving fast and/or when the latency requirements of the UE 120 specify constant control and data connectivity with the PCell while the UE 120 is moving.

L1/L2 signaling 407 can activate and deactivate cells in the set and select beams within the activated cells for seamless mobility within the activated cells in the set. As the UE 120 moves, the cells from the set may be deactivated and activated by L1/L2 signaling 407. For example, the deactivation and/or the activation may be based on the signal quality (e.g., measurement reports) and cell loading.

In a carrier aggregation framework, cells may be signaled to be removed from an L1/L2 mobility configured cell set. As the UE 120 moves, some cells may no longer be suitable for L1/L2 mobility, such as when the UE 120 moves too far away from the cells. As a result, it may not be necessary to keep those cells in the L1/L2 mobility configured cell set 401. Cells not in use may be stored in the deactivated cell set 405 in the L1/L2 mobility configured cell set 401. However, the UE 120 may still need to perform measurement on the deactivated cell set 405, resulting in unnecessary power consumption. Even if the UE 120 is configured to not perform measurement on the deactivated cells, the UE 120 may have a capability limit of a maximum number of cells supported in the L1/L2 mobility configured cell set 401.

In aspects of the present disclosure, L1/L2 signaling 407 may remove cells from the L1/L2 mobility configured cell set 401, releasing the cells from the L1/L2 mobility configured cell set 401. These techniques are different from legacy cell deactivation MAC-CEs. Other aspects include a MAC-CE/downlink control information (DCI) format design and error handling techniques.

L1/L2 signaling 407 may reduce the latency to update a UE 120 to a new PCell by using an activation update configuration, combined with configuring the UE 120 with alternate configurations, for each cell. For example, configuring the UE 120 with alternate configurations includes, for example, the RRC configuration 402, and additionally including at least a primary cell configuration for each secondary cell and at least a secondary cell configuration for each primary cell. Also, the L1/L2 signaling 407, including the activation update configuration, may indicate at least one of a first cell of the L1/L2 mobility configured cell set 401 as being changed from a primary cell to a secondary cell, or a second cell of the configured cell set as being changed from a secondary cell to a primary cell. According to the described aspects: the L1/L2 mobility configured cell set 401 is an RRC-configured set of cells for L1/L2 mobility; the activated cell set 403 is an L1/L2 mobility activated cell set including a group of cells in the configured set that are activated and can be readily used for data and control transfer; and the deactivated cell set 405 is an L1/L2 mobility deactivated cell set including a group of cells in the configured set that are deactivated and can be readily activated by L1/L2 signaling 407. Consequently, L1/L2 signaling 407 activates/deactivates cells in the set and selects beams within the activated cells. For example, as the UE 120 moves, the cells from the set are deactivated and activated by L1/L2 signaling 407 based on the signal quality (e.g., measurement reports) and/or cell loading.

In other words, all cells in the L1/L2 mobility configured cell set 401 have valid primary cell and secondary cell configurations, and L1/L2 signaling 407 is used to set or select the primary cell out of the preconfigured options within the activated cell set 403. For example, L1/L2 signaling 407 switches a secondary cell to a primary cell (and a primary cell to a secondary cell), which is faster and more efficient than current solutions, where a primary cell can only be changed using L3 signaling. Also, RRC signaling (e.g., L3) updates the set of cells for L1/L2 mobility. Thus, signaling of individual cell configurations enables each secondary cell with a primary cell configuration. Also, the present aspects relate to signaling of the change of cells in the L1/L2 mobility configured cell set 401, including example signaling to remove cells from the L1/L2 mobility configured cell set 401.

Therefore, the present aspects specify mechanisms and procedures of L1/L2-based inter-cell mobility for mobility latency reduction, which may include configuration and maintenance for multiple candidate cells to allow fast application of configurations for candidate cells, and/or a dynamic switch mechanism among candidate serving cells (including special cell (SpCell) and secondary cell (SCell)) for potential applicable switching scenarios based on L1/L2 signaling.

Figure 5:
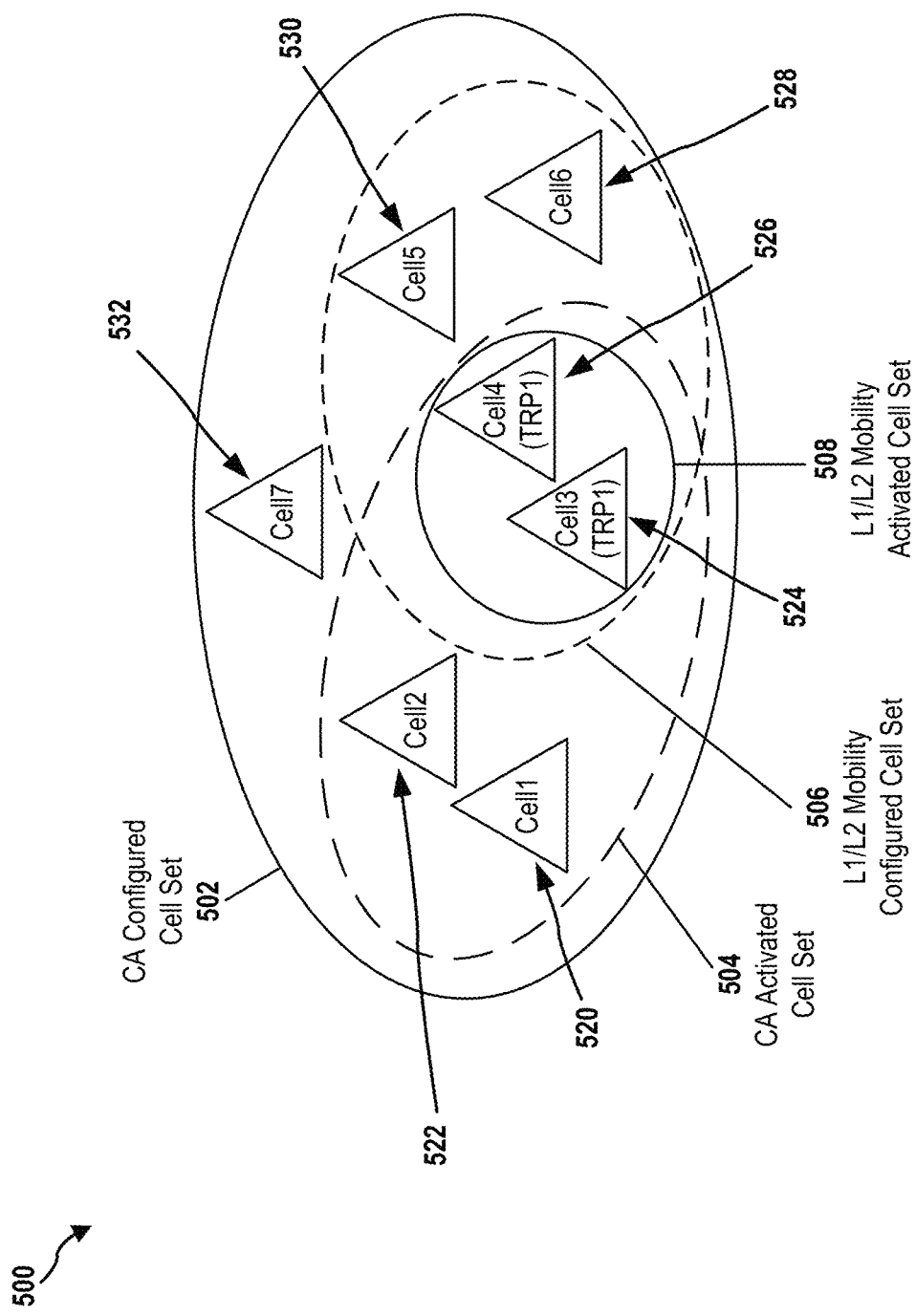
FIG. 5 is a block diagram illustrating an example of a carrier aggregation configured cell set, in accordance with various aspects of the present disclosure.

FIG. 5 is a diagram illustrating an example of a carrier aggregation configured cell set, in accordance with various aspects of the present disclosure. The diagram 500 includes an example of a carrier aggregation (CA) configured cell set 502, which will be discussed in the context of L1/L2 mobility, carrier aggregation configuration, and individual cell signaling. In FIG. 5, a network entity (e.g., BS 110) (not shown separately in FIG. 5) may configure the CA configured cell set 502. The CA configured cell set 502 may include cells 520, 522, 524, 526, 528, 530, and 532. Each of the cells 520, 522, 524, 526, 528, 530, and 532 may operate on different frequencies. In some implementations, one or more of the cells in the CA configured cell set 502 may be mTRP cells. For example, in FIG. 5, cells 524 and 526 may be mTRP cells, where Cell3 may be one TRP of the mTRP cell 524 operating at a frequency different from another TRP of the mTRP cell 524 operating at a different frequency, and Cell4 may be one TRP of the mTRP cell 526 operating at a frequency different from another TRP of the mTRP cell 526 operating at a different frequency. Only one frequency may be activated at a time for mTRP cells, and the mTRP cell may operate using the TRP corresponding to that frequency.

Within the CA configured cell set 502, the network entity (e.g., BS 110) may configure a first set of cells as part of a CA activated cell set 504. For example, as shown in FIG. 5, the network entity (e.g., BS 110) may configure cells 520, 522, 524, and 526 as part of the CA activated cell set 504. The network entity (e.g., BS 110) may configure a second set of cells as part of a L1/L2 mobility configured cell set 506. For example, the network entity (e.g., BS 110) may configure cells 524, 526, 528, and 530 as part of the L1/L2 mobility configured cell set 506. The network entity (e.g., BS 110) may configure one or more cells as activated cells and part of a L1/L2 mobility activated cell set 508. For example, the network entity (e.g., BS 110) may configure cells 524 and 526 as activated cells and may include the cells 524 and 526 as part of the L1/L2 mobility activated cell set 508.

The network entity (e.g., BS 110) may transmit one or more configurations for the CA configured cell set 502 to a UE (e.g., UE 120) (not shown separately in FIG. 5). The configuration(s) for the CA configured cell set 502 may indicate all the cells configured to be part of the CA configured cell set 502. For example, the configuration(s) may indicate to the UE 120 that the cells 520, 522, 524, 526, 528, 530, and 532 are part of the CA configured cell set 502. In some implementations, the configuration for the CA configured cell set 502 may indicate a special cell (SpCell) or a primary cell (PCell) for the UE 120 from the cells configured in the CA configured cell set 502, and/or one or more secondary cells (SCells) for the UE 120 in the CA from the cells configured in the CA configured cell set 502. For example, if cell 524 is configured to be an SpCell or a PCell for the UE 120, then the configuration(s) for the CA configured cell set 502 may indicate that the cell 524 is an SpCell or a PCell. Similarly, the configuration(s) for the CA configured cell set 502 may indicate that cells 520, 522, 526, 528, 530, and 532 are SCells for the UE 120. The network entity (e.g., BS 110) may transmit the configuration(s) for the CA configured cell set 502 via a layer three (L3) message (e.g., RRC message(s), RRC configuration(s), and the like).

In some implementations, the network entity (e.g., BS 110) may indicate to the UE 120 the cells that are configured to be part of the CA activated cell set 504. In some implementations, the network entity (e.g., BS 110) may indicate the cells in the CA activated cell set 504 in the CA configured cell set 502 configuration. In some implementations, the network entity (e.g., BS 110) may indicate the cells in the CA activated cell set 504 via one or more L3 messages.

The network entity (e.g., BS 110) may indicate to the UE 120 the cells that are configured to be part of the L1/L2 mobility configured cell set 506 and/or the cells that are configured to be part of the L1/L2 mobility activated cell set 508, via an L3 message (e.g., via RRC messages, RRC configuration, and the like). In some implementations, the network entity (e.g., BS 110) may indicate the L1/L2 mobility configured cell set 506 and/or the L1/L2 mobility activated cell set 508 in the configuration(s) of the CA configured cell set 502. In this case, the network entity (e.g., BS 110) may utilize the carrier aggregation configuration with additional information elements to facilitate L1/L2 mobility within the CA configured cell set 502. The L1/L2 mobility configured cell set 506 may be a subset of, or may encompass the whole of, the CA configured cell set 502.

For each cell in the L1/L2 mobility configured cell set 506, the network entity (e.g., BS 110) may determine one or more special cell (SpCell) or primary cell (PCell) configurations and/or one or more secondary cell (SCell) configurations. The network entity (e.g., BS 110) may indicate individually to each cell, the one or more SpCell or PCell configurations, or the one or more SCell configurations in an L1/L2 mobility configuration (L1L2MobilityConfig). In some implementations, the network entity (e.g., BS 110) may include the L1/L2 mobility configuration in the CA configured cell set 502 configuration(s) for the cell. In some implementations, the network entity (e.g., BS 110) may indicate or transmit the L1/L2 mobility configuration in a separate configuration via an L3 message (e.g., via an RRC message, RRC configuration, and the like).

In some implementations, for each cell in the L1/L2 mobility configured cell set 506, the L1/L2 mobility configuration may include one or more complimentary or alternative configurations to its existing cell type (e.g., SpCell/PCell for an SCell, or SCell for an PCell/SpCell) configuration. For example, if the cell 524 is configured as the PCell for a UE (e.g., UE 120), then the network entity (e.g., BS 110), in the L1/L2 mobility configuration, may indicate one or more SCell configurations for the cell 524 to allow a quick switch of configurations, such as if a currently configured secondary cell (e.g., the cell 526) is switched to be a primary cell. Similarly, if the cell 526 is configured as an SCell for the UE 120, then the network entity (e.g., BS 110), in the L1/L2 mobility configuration, may indicate one or more SpCell or PCell configurations for the cell 526 to allow a quick switch of configurations (e.g., if the cell 526 is switched to be a primary cell). As described, the L1/L2 signaling to switch the configuration of a cell being used by the UE 120 may be referred to as an activation update configuration. It should be noted that the L1/L2 mobility configuration may provide multiple different primary cell configurations and/or secondary cell configurations for each cell, where the actual configuration to be activated is specified in the L1/L2 signaling. Moreover, the L1/L2 mobility configuration may include an L1 measurement configuration for each cell in a deactivated cell state.

Figure 6:
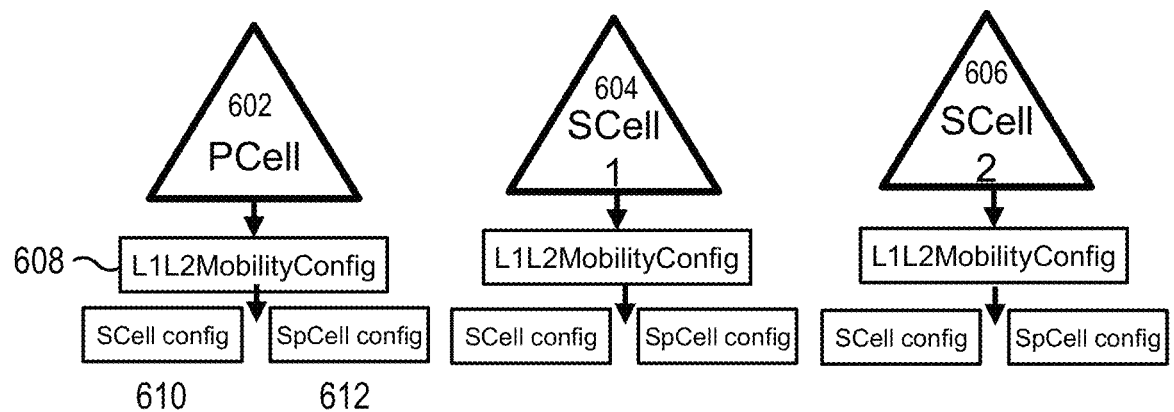
FIG. 6 is a block diagram illustrating an example of a carrier aggregation configuration including cells with LT/L2 mobility configurations, in accordance with aspects of the present disclosure.

FIG. 6 is a block diagram illustrating an example of a carrier aggregation configuration including cells with L1/L2 mobility configurations, in accordance with aspects of the present disclosure. In the example of FIG. 6, a carrier aggregation configuration includes a PCell 602, and two SCells 604 and 606, although the disclosure is not limited to any particular number of SCells. Each cell 602, 604, and 608 includes an L1/L2 mobility configuration (L1L2MobilityConfig) 608. For ease of explanation, only the configuration of the PCell 602 is discussed. The other configurations may be similar. In this example, the L1/L2 mobility configuration (L1L2MobilityConfig) 608 includes a secondary cell group configuration (SCellConfig) 610 and a special cell configuration (SpCellConfig) 612. For each of the cells 602, 604, and 608, the network entity (e.g., BS 110) may indicate multiple L1/L2 mobility configurations 608, although only one is depicted. The L1L2MobilityConfig 608 may contain one or more L1 measurement configurations for measuring cells in a deactivated state, which may be reported in a measurement report for UE mobility (e.g., if the UE 120 moves into a location where the deactivated cell should be activated). In some cases, more than one SpCell/SCell configuration 610, 612 may be provided for a cell (e.g., a list of each type of configuration may be provided), and the actual configuration to be activated may be specified by L1/L2 signaling. For instance, the L1/L2 signaling may indicate an SCell configuration 610 to apply if a cell is updated from PCell to SCell by an L1/L2 mobility procedure. In another example, the L1/L2 signaling may indicate an SpCell configuration 612 to apply if a cell is updated from SCell to PCell by the L1/L2 mobility procedure.

Techniques for L1/L2 mobility deconfiguration will now be described. When a cell is added to an L1/L2 mobility cell set, a position in a bitmap may be assigned and then used by the network entity (e.g., BS 110) to activate and deactivate cells. The procedure may be extended to add another media access control-control element (MAC-CE) or downlink control information (DCI) format to release a cell, with the same position in the bitmap. Instead of being deactivated, the cell is released and/or removed from the configured set. Thus, the cell is no longer available for L1/L2 mobility. In some aspects, a separate new MAC-CE and/or DCI message may release one or more cells from the configured cell set. In other aspects, the release of a cell is indicated by coupling with existing L1/L2 signaling, and utilizing a bit, such as a reserved bit.

Figure 7:
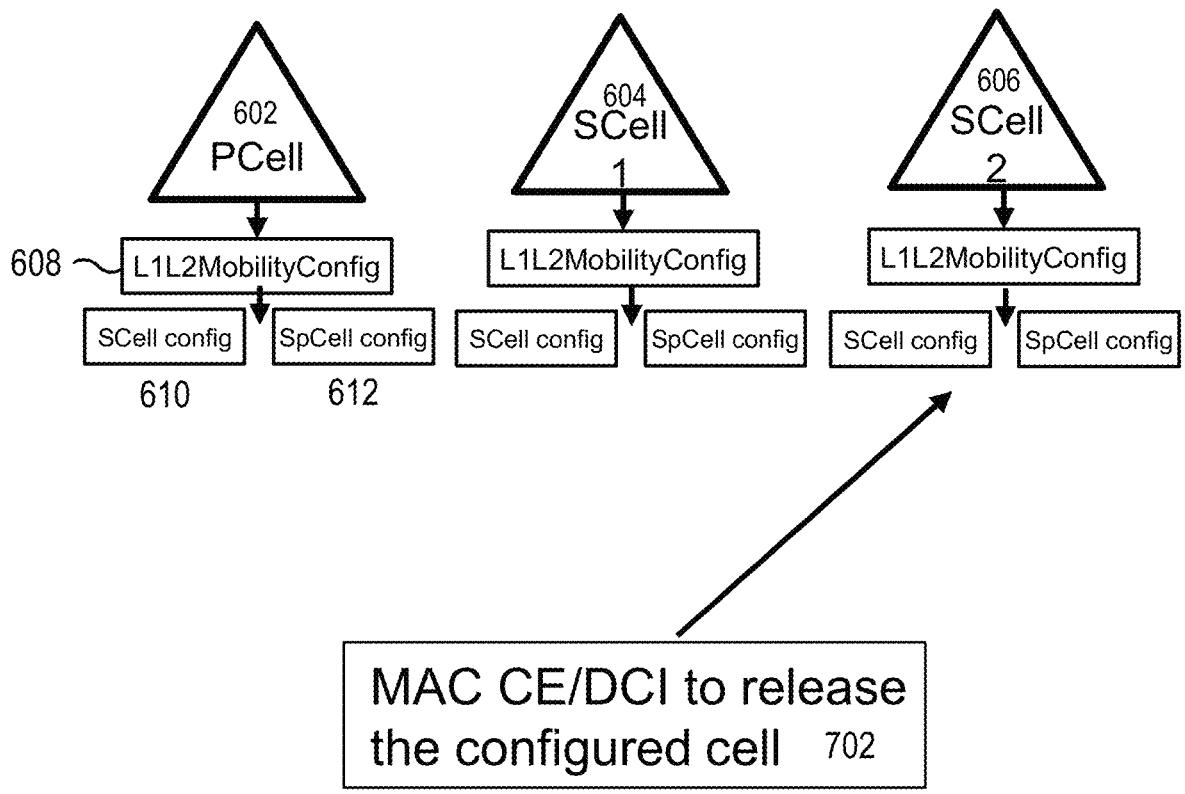
FIG. 7 is a block diagram illustrating an example of a carrier aggregation configuration and an LT/L2 mobility deconfiguration, in accordance with aspects of the present disclosure.

FIG. 7 is a block diagram illustrating an example of a carrier aggregation configuration and an L1/L2 mobility deconfiguration, in accordance with aspects of the present disclosure. In the example of FIG. 7, a carrier aggregation configuration includes a PCell 602, and two SCells 604 and 606, although the disclosure is not limited to this number of SCells. Each cell includes an L1/L2 mobility configuration (L1L2MobilityConfig) 608. In this example, the L1/L2 mobility configuration (L1L2MobilityConfig) 608 include a secondary cell group configuration (SCellConfig) 610 and a special cell configuration (SpCellConfig) 612. A network entity (e.g., BS 110) transmits a message 702 to release the configured SCell 606. In aspects of the present disclosure, two levels of cell release are available. A first level includes L1/L2 mobility configuration release of the cell (e.g., removing the cell from the L1/L2 mobility cell set). The second level is whole cell release (e.g., removing the cell from the CA configured set). In the example of FIG. 7, the cell 606 is released from L1/L2 mobility and thus no longer available for L1/L2 mobility.

Figure 8:
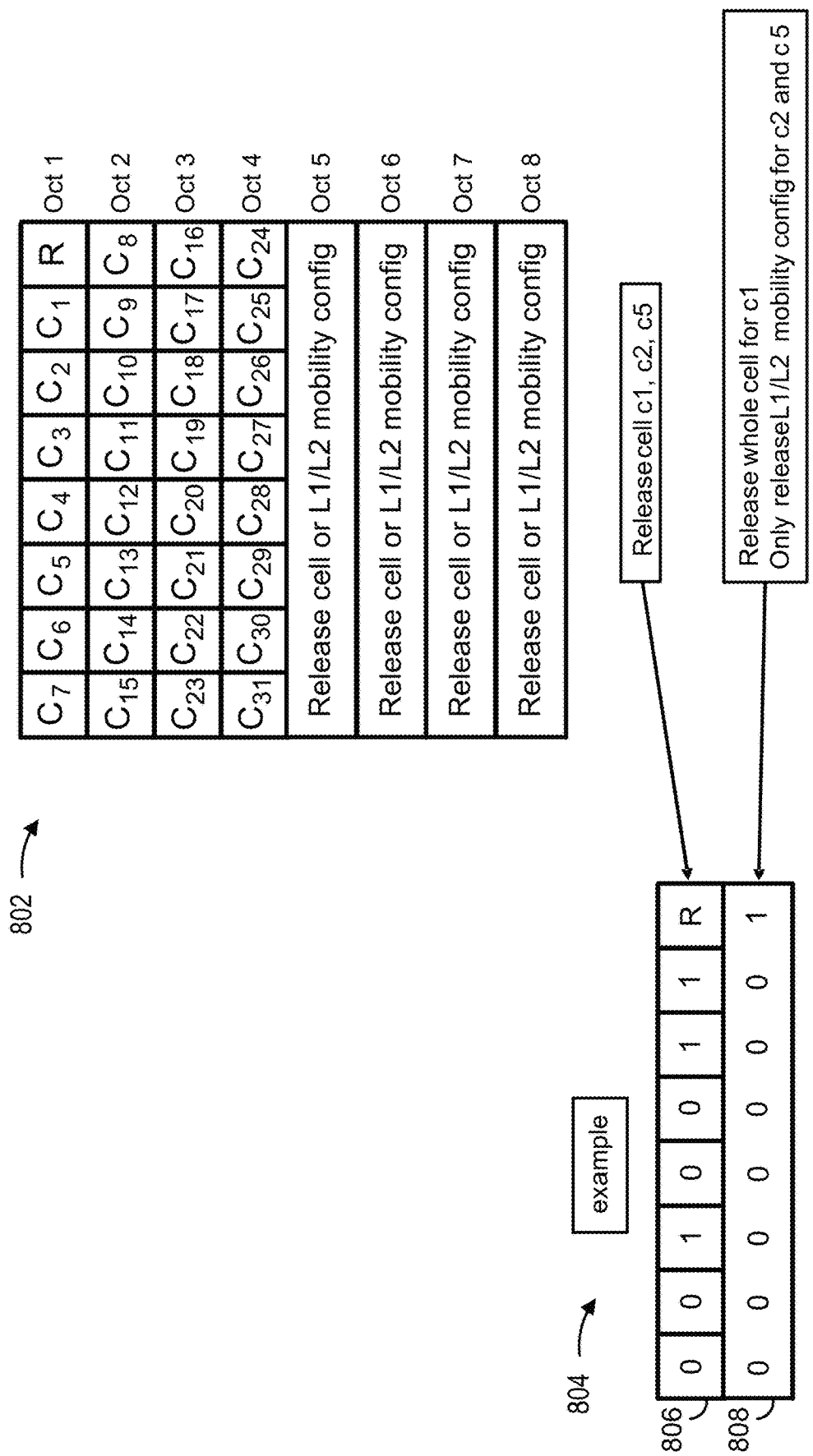
FIG. 8 is a block diagram illustrating an example LT/L2 mobility deconfiguration media access control-control element (MAC-CE), in accordance with aspects of the present disclosure.

An example L1/L2 mobility deconfiguration MAC-CE for releasing a cell will be described with respect to FIG. 8. FIG. 8 is a block diagram illustrating an example L1/L2 mobility deconfiguration media access control-control element (MAC-CE), in accordance with aspects of the present disclosure. In the example of FIG. 8, a MAC-CE 802 includes eight octets (e.g., Oct 1, Oct 2, Oct 3, Oct 4, Oct 5, Oct 6, Oct 7, and Oct 8). In the first four octets (Oct 1, Oct 2, Oct 3, and Oct 4), each C field is a binary bit corresponding to each cell index configured in the L1/L2 mobility cell set. For example, a value of $C_i=1$ denotes releasing of the cell with index i. The value of R in the first octet, Oct 1, indicates a bit is reserved for future use.

In some implementations (e.g., as shown in FIG. 8), up to four more octets are included. These additional octets (Oct 5, Oct 6, Oct 7, and Oct 8) denote whether to remove the whole cell or the L1/L2 mobility configuration for the cell. In these example implementations, each bit in an octet corresponds to the cell to be released (e.g., in ascending order). A value of 1 may represent removal of the whole cell. A value of 0 may represent removal of only the L1/L2 mobility configuration for the cell. In an example 804 with two octets, a first octet 806 indicates that cells c1, c2, and c5 are released. A second octet 808 indicates release of a cell c1 from a carrier aggregation configuration. In this example, the second octet 808 indicates the L1/L2 mobility configuration is released for cells c2 and c5, but these cells remain in the carrier aggregation set.

Additional aspects are related to L1/L2 mobility deconfiguration error handling. Because the network entity (e.g., BS 110) is in control of when messages are transmitted, there are no catastrophic consequences from transmission errors related to L1/L2 mobility. An example of an error is when the UE 120 does not receive L1/L2 signaling and the network entity (e.g., BS 110) is unaware of the fact that the signaling was not received. In this case, the network entity (e.g., BS 110) may choose not to utilize the bits for cells that are released. Most of the time, the signaling is expected to be received by the UE 120 and the UE 120 can free up the memory that was occupied by information linked to the released cells. When new cells are added, the network entity (e.g., BS 110) can utilize positions in the bitmap that correspond to cells that were previously released. The network entity (e.g., BS 110) and UE 120 do not need to be synchronized with the released cells, but will always be synchronized with configured cells, which are signaled by more reliable RRC signaling.

An alternative solution includes enhanced cross-layer signaling for error handling. With this solution, the network entity (e.g., BS 110) may indirectly determine if the L1/L2 mobility signaling was received. In these aspects, cross-layer functionality at the network entity (e.g., BS 110) may be utilized to interpret successful receiving, by the UE 120, of the MAC-CE/DCI. For example, when the network entity (e.g., BS 110) sends a cell releasing MAC-CE, the network entity (e.g., BS 110) records the physical downlink shared channel (PDSCH) transport block (TB) ID that contains the cell releasing MAC-CE. When the UE 120 sends an acknowledgement (ACK) to the corresponding PDSCH TB, the network entity (e.g., BS 110) extracts the content acknowledged in that TB and determines the UE 120 successfully received the MAC-CE. If UE 120 does not receive the MAC-CE, the network entity (e.g., BS 110) may retransmit the MAC-CE at a later time.

As indicated above, FIGS. 4-8 are provided as examples. Other examples may differ from what is described with respect to FIGS. 4-8.

Figure 9:
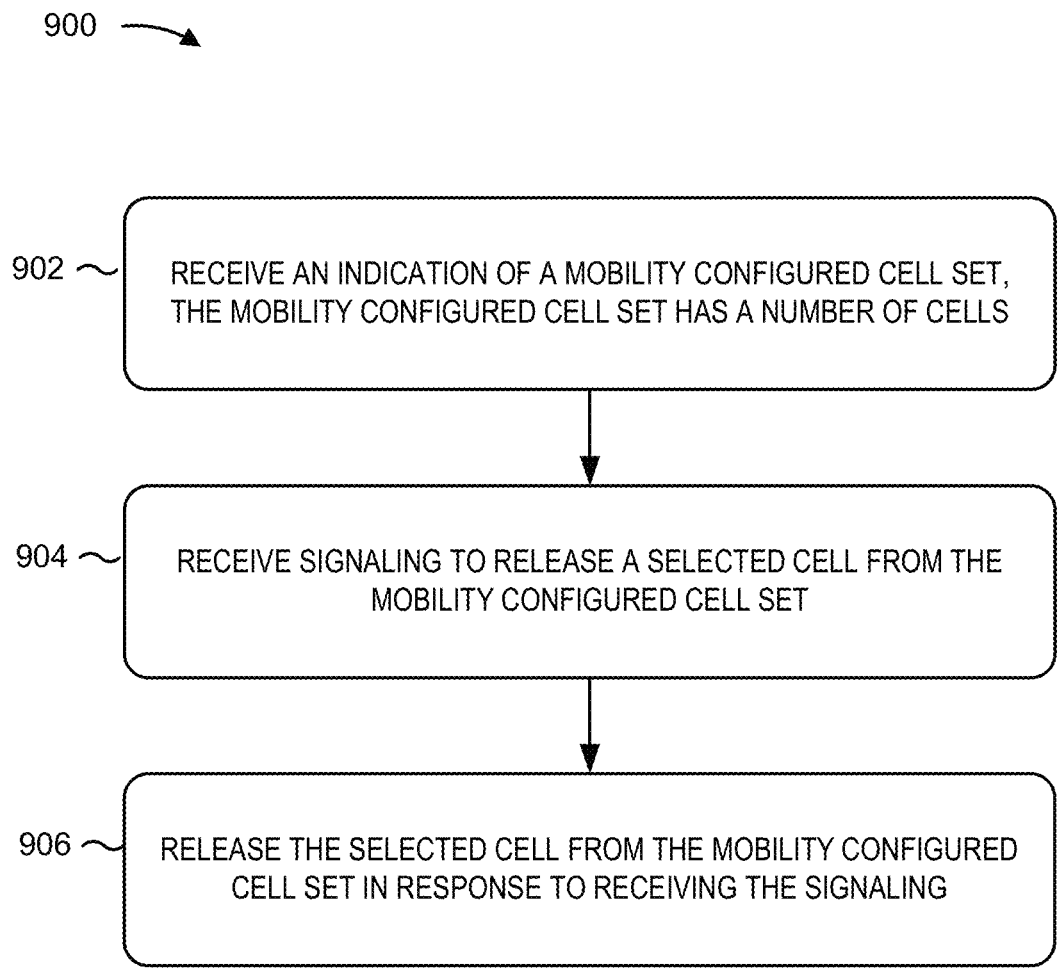
FIG. 9 is a flow diagram illustrating an example process performed, for example, by a user equipment (UE), in accordance with various aspects of the present disclosure.

FIG. 9 is a flow diagram illustrating an example process 900 performed, for example, by a user equipment (UE), in accordance with various aspects of the present disclosure. The example process 900 is an example of layer one and/or layer two (L1/L2) signaling to release cells that are configured for L1/L2 inter-cell mobility. The operations of the process 900 may be implemented by a UE 120.

At block 902, the user equipment (UE) receives an indication of a mobility configured cell set. The mobility configured cell set has a number of cells. For example, the UE (e.g., using the antenna 252, DEMOD/MOD 254, MIMO detector 256, receive processor 258, controller/processor 280, memory 282, and or the like) may receive the indication. The indication may be a radio resource control (RRC) configuration. The mobility configured cell set may have a configuration identifying one or more primary cell configurations for each secondary cell in the configured cell set, one or more secondary cell configurations for each primary cell in the configured cell set, and a measurement configuration for each cell in the configured cell set.

At block 904, the user equipment (UE) receives signaling to release a selected cell of the number of cells from the mobility configured cell set. For example, the UE (e.g., using the antenna 252, DEMOD/MOD 254, MIMO detector 256, receive processor 258, controller/processor 280, memory 282, and or the like) may receive the signaling. In some aspects, the signaling comprises layer one (L1) signaling. In other aspects, the signaling comprises layer two (L2) signaling. The signaling may be a media access control-control element (MAC-CE) having a first octet indicating release of the selected cell from the mobility configured cell set, and a second octet indicating removal of a mobility configuration for the selected cell.

At block 906, the user equipment (UE) releases the selected cell from the mobility configured cell set in response to receiving the signaling. For example, the UE (e.g., using the controller/processor 280, memory 282, and or the like) may release the selected cell. In some aspects, releasing the selected cell comprises removing the selected cell from a carrier aggregation configuration. In other aspects, releasing the selected cell comprises removing a mobility configuration for the selected cell.

Figure 10:
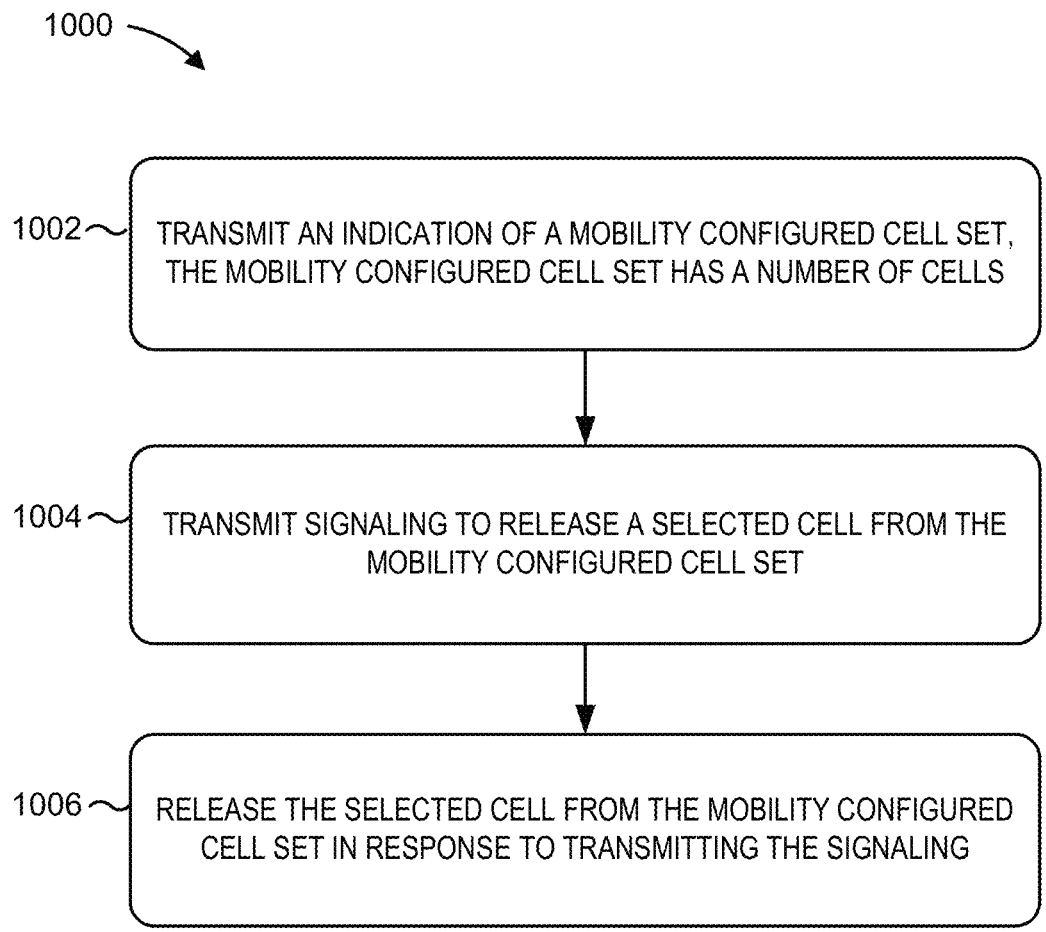
FIG. 10 is a flow diagram illustrating an example process performed, for example, by a network device, in accordance with various aspects of the present disclosure.

FIG. 10 is a flow diagram illustrating an example process 1000 performed, for example, by a network device, in accordance with various aspects of the present disclosure. The example process 1000 is an example of layer one and/or layer two (L1/L2) signaling to release cells that are configured for L1/L2 inter-cell mobility. The operations of the process 1000 may be implemented by a network entity 110.

At block 1002, the network entity transmits an indication of a mobility configured cell set. The mobility configured cell set has a number of cells. For example, the network entity (e.g., using the antenna 234, MOD/DEMOD 232, TX MIMO processor 230, transmit processor 220, controller/processor 240, memory 242, and or the like) may transmit the indication. The indication may be a radio resource control (RRC) configuration. The mobility configured cell set may have a configuration identifying one or more primary cell configurations for each secondary cell in the configured cell set, one or more secondary cell configurations for each primary cell in the configured cell set, and a measurement configuration for each cell in the configured cell set.

At block 1004, the network entity transmits signaling to release a selected cell of the number of cells from the mobility configured cell set. For example, the network entity (e.g., using the antenna 234, MOD/DEMOD 232, TX MIMO processor 230, transmit processor 220, controller/processor 240, memory 242, and or the like) may transmit the signaling. In some aspects, the signaling comprises layer one (L1) signaling. In other aspects, the signaling comprises layer two (L2) signaling. The signaling may be a media access control-control element (MAC-CE) having a first octet indicating release of the selected cell from the mobility configured cell set, and a second octet indicating removal of a mobility configuration for the selected cell.

At block 1006, the network entity releasing the selected cell from the mobility configured cell set in response to transmitting the signaling. For example, the network entity (e.g., using the controller/processor 240, memory 242, and or the like) may release the selected cell. In some aspects, releasing the selected cell comprises removing the selected cell from a carrier aggregation configuration. In other aspects, releasing the selected cell comprises removing a mobility configuration for the selected cell.

Example Aspects

Aspect 1: A method of wireless communication by a user equipment (UE), comprising: receiving an indication of a mobility configured cell set comprising a plurality of cells; receiving signaling to release a selected cell of the plurality of cells from the mobility configured cell set; and releasing the selected cell from the mobility configured cell set in response to receiving the signaling.

Aspect 2: The method of Aspect 1, in which releasing the selected cell comprises removing the selected cell from a carrier aggregation configuration.

Aspect 3: The method of Aspect 1, in which releasing the selected cell comprises removing a mobility configuration for the selected cell.

Aspect 4: The method of any of the preceding Aspects, in which the signaling comprises layer one (L1) signaling.

Aspect 5: The method of any of the Aspects 1-3, in which the signaling comprises layer two (L2) signaling.

Aspect 6: The method of any of the preceding Aspects, in which the indication is a radio resource control (RRC) configuration.

Aspect 7: The method of any of the preceding Aspects, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

Aspect 8: The method of any of the preceding Aspects, in which the signaling comprises a media access control-control element (MAC-CE) having a first octet indicating release of the selected cell from the mobility configured cell set, and a second octet indicating removal of a mobility configuration for the selected cell.

Aspect 9: A method of wireless communication by a network entity, comprising: transmitting an indication of a mobility configured cell set comprising a plurality of cells;

transmitting signaling to release a selected cell of the plurality of cells from the mobility configured cell set; and releasing the selected cell from the mobility configured cell set in response to transmitting the signaling.

Aspect 10: The method of Aspect 9, in which releasing the selected cell comprises removing the selected cell from a carrier aggregation configuration.

Aspect 11: The method of Aspect 9, in which releasing the selected cell comprises removing a mobility configuration for the selected cell.

Aspect 12: The method of any of the Aspects 9-11, in which the signaling comprises layer one (L1) signaling.

Aspect 13: The method of any of the Aspects 9-11, in which the signaling comprises layer two (L2) signaling.

Aspect 14: The method of any of the Aspects 9-13, in which the indication is a radio resource control (RRC) configuration.

Aspect 15: The method of any of the Aspects 9-14, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

Aspect 16: The method of any of the Aspects 9-14, in which the signaling comprises a media access control-control element (MAC-CE) having a first octet indicating release of the selected cell from the mobility configured cell set, and a second octet indicating removal of a mobility configuration for the selected cell.

Aspect 17: The method of any of the Aspects 9-15, further comprising: recording an identifier associated with a physical downlink shared channel (PDSCH) containing the signaling to release the selected cell; receiving an acknowledgment of the PDSCH; and confirming content associated with the acknowledgment indicates successful receipt of the signaling to release the selected cell.

Aspect 18: An apparatus for wireless communication, comprising: a memory; and at least one processor coupled to the memory, the at least one processor configured: to receive an indication of a mobility configured cell set comprising a plurality of cells; to receive signaling to release a selected cell of the plurality of cells from the mobility configured cell set; and to release the selected cell from the mobility configured cell set in response to receiving the signaling.

Aspect 19: The apparatus of Aspect 18, in which the at least one processor releases the selected cell by removing the selected cell from a carrier aggregation configuration.

Aspect 20: The apparatus of Aspect 18, in which the at least one processor releases the selected cell by removing a mobility configuration for the selected cell.

Aspect 21: The apparatus of Aspect 18, in which the signaling comprises layer one (L1) signaling.

Aspect 22: The apparatus of any of the Aspects 18-21, in which the signaling comprises layer two (L2) signaling.

Aspect 23: The apparatus of any of the Aspects 18-22, in which the indication is a radio resource control (RRC) configuration.

Aspect 24: The apparatus of any of the Aspects 18-23, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

Aspect 25: The apparatus of any of the Aspects 18-24, in which the signaling comprises a media access control-control element (MAC-CE) having a first octet indicating release of the selected cell from the mobility configured cell set, and a second octet indicating removal of a mobility configuration for the selected cell.

Aspect 26: An apparatus for wireless communication, comprising: a memory; and at least one processor coupled to the memory, the at least one processor configured: to transmit an indication of a mobility configured cell set comprising a plurality of cells; to transmit signaling to release a selected cell of the plurality of cells from the mobility configured cell set; and to release the selected cell from the mobility configured cell set in response to transmitting the signaling.

Aspect 27: The apparatus of Aspect 26, in which the at least one processor releases the selected cell by removing the selected cell from a carrier aggregation configuration.

Aspect 28: The apparatus of Aspect 26, in which the at least one processor releases the selected cell by removing a mobility configuration for the selected cell.

Aspect 29: The apparatus of any of the Aspects 26-28, in which the signaling comprises layer one (L1) signaling.

Aspect 30: The apparatus of any of the Aspects 26-28, in which the signaling comprises layer two (L2) signaling.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
 receiving an indication of a mobility configured cell set comprising a plurality of cells;
 receiving signaling to release a selected cell of the plurality of cells from the mobility configured cell set; and
 releasing the selected cell from the mobility configured cell set in response to receiving the signaling wherein the signaling comprises a media access control-control element (MAC-CE) having a first octet indicating release of the selected cell from the mobility configured cell set, and a second octet indicating removal of a mobility configuration for the selected cell.

2. The method of claim 1, in which releasing the selected cell comprises removing the selected cell from a carrier aggregation configuration.

3. The method of claim 1, in which releasing the selected cell comprises removing a mobility configuration for the selected cell.

4. The method of claim 1, in which the signaling comprises layer one (L1) signaling.

5. The method of claim 1, in which the signaling comprises layer two (L2) signaling.

6. The method of claim 1, in which the indication is a radio resource control (RRC) configuration.

7. The method of claim 1, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

8. A method of wireless communication by a network entity, comprising:
 transmitting an indication of a mobility configured cell set comprising a plurality of cells;
 transmitting signaling to release a selected cell of the plurality of cells from the mobility configured cell set; and
 releasing the selected cell from the mobility configured cell set in response to transmitting the signaling, in which the signaling comprises a media access control-control element (MAC-CE) having a first octet indicating release of the selected cell from the mobility configured cell set, and a second octet indicating removal of a mobility configuration for the selected cell.

9. The method of claim 8, in which releasing the selected cell comprises removing the selected cell from a carrier aggregation configuration.

10. The method of claim 8, in which releasing the selected cell comprises removing a mobility configuration for the selected cell.

11. The method of claim 8, in which the signaling comprises layer one (L1) signaling.

12. The method of claim 8, in which the signaling comprises layer two (L2) signaling.

13. The method of claim 8, in which the indication is a radio resource control (RRC) configuration.

14. The method of claim 8, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

15. The method of claim 8, further comprising:
 recording an identifier associated with a physical downlink shared channel (PDSCH) containing the signaling to release the selected cell;
 receiving an acknowledgment of the PDSCH; and
 confirming content associated with the acknowledgment indicates successful receipt of the signaling to release the selected cell.

16. An apparatus for wireless communication, comprising:
 a memory; and
 at least one processor coupled to the memory, the at least one processor configured:
  to receive an indication of a mobility configured cell set comprising a plurality of cells;
  to receive signaling to release a selected cell of the plurality of cells from the mobility configured cell set; and
  to release the selected cell from the mobility configured cell set in response to receiving the signaling wherein the signaling comprises a media access control-control element (MAC-CE) having a first octet indicating release of the selected cell from the mobility configured cell set, and a second octet indicating removal of a mobility configuration for the selected cell.

17. The apparatus of claim 16, in which the at least one processor releases the selected cell by removing the selected cell from a carrier aggregation configuration.

18. The apparatus of claim 16, in which the at least one processor releases the selected cell by removing a mobility configuration for the selected cell.

19. The apparatus of claim 18, in which the signaling comprises layer one (L1) signaling.

20. The apparatus of claim 16, in which the signaling comprises layer two (L2) signaling.

21. The apparatus of claim 16, in which the indication is a radio resource control (RRC) configuration.

22. The apparatus of claim 16, in which the mobility configured cell set has a configuration identifying one or more primary cell configurations for each secondary cell in the configured cell set, one or more secondary cell configurations for each primary cell in the configured cell set, and a measurement configuration for each cell in the configured cell set.

23. An apparatus for wireless communication, comprising:
 a memory; and
 at least one processor coupled to the memory, the at least one processor configured:
  to transmit an indication of a mobility configured cell set comprising a plurality of cells;

to transmit signaling to release a selected cell of the plurality of cells from the mobility configured cell set; and to release the selected cell from the mobility configured cell set in response to transmitting the signaling wherein the signaling comprises a media access control-control element (MAC-CE) having a first octet indicating release of the selected cell from the mobility configured cell set, and a second octet indicating removal of a mobility configuration for the selected cell.

24. The apparatus of claim 23, in which the at least one processor releases the selected cell by removing the selected cell from a carrier aggregation configuration.

25. The apparatus of claim 23, in which the at least one processor releases the selected cell by removing a mobility configuration for the selected cell.

26. The apparatus of claim 23, in which the signaling comprises layer one (L1) signaling.

27. The apparatus of claim 23, in which the signaling comprises layer two (L2) signaling.

* * * * *